US012649660B2

(12) United States Patent
Luly et al.

(10) Patent No.: US 12,649,660 B2
(45) **Date of Patent: *Jun. 9, 2026**

(54) INTEGRATED PROCESSES FOR PRODUCING BIS(FLUOROSULFONYL) IMIDE

(71) Applicant: Honeywell International Inc., Charlotte, NC (US)

(72) Inventors: Matthew H. Luly, Hamburg, NY (US); Bernard E. Pointner, Buffalo, NY (US); Brian Leone, Morris Plains, NJ (US)

(73) Assignee: Solstice Advanced Materials US, Inc., Parsippany, NJ (US)

(*) Notice: Subject to any disclaimer, the term of this patent is extended or adjusted under 35 U.S.C. 154(b) by 608 days.

This patent is subject to a terminal disclaimer.

(21) Appl. No.: 18/101,226

(22) Filed: Jan. 25, 2023

(65) Prior Publication Data

US 2023/0159332 A1 May 25, 2023

Related U.S. Application Data

(63) Continuation of application No. 17/117,284, filed on Dec. 10, 2020, now Pat. No. 11,591,218.

(60) Provisional application No. 62/949,105, filed on Dec. 17, 2019.

(51) Int. Cl.

| | |
|---|---|
| ***C01B 21/093*** | (2006.01) |
| ***B01D 3/14*** | (2006.01) |
| ***B01J 19/00*** | (2006.01) |

(52) U.S. Cl.

CPC .............. *C01B 21/093* (2013.01); *B01D 3/14* (2013.01); *B01J 19/0013* (2013.01); *B01D 2202/00* (2013.01); *B01J 2219/00031* (2013.01); *B01J 2219/00033* (2013.01)

(58) Field of Classification Search

CPC ....... C01B 21/093; C01B 21/086; B01D 3/14; B01D 2202/00; B01D 3/143; B01J 19/0013; B01J 2219/00031; B01J 2219/00033; B01J 2219/00049; B01J 2219/00051; B01J 2219/00074; B01J 2219/00076; B01J 2219/00083; B01J 2219/00087; B01J 2219/00094; B01J 3/04; B01J 19/18; B01J 19/24; Y02E 60/10; Y02P 20/10

See application file for complete search history.

(56) References Cited

U.S. PATENT DOCUMENTS

| | | | |
|---|---|---|---|
| 8,337,797 | B2 | 12/2012 | Honda et al. |
| 8,580,220 | B2 | 11/2013 | Honda et al. |
| 8,722,005 | B1 | 5/2014 | Poshusta et al. |
| 9,156,692 | B2 | 10/2015 | Honda et al. |
| 9,181,173 | B2 | 11/2015 | Johnson |
| 9,475,764 | B2 | 10/2016 | Johnson |
| 10,734,664 | B1 | 8/2020 | Singh et al. |
| 2012/0009113 | A1 | 1/2012 | Honda et al. |
| 2013/0066110 | A1 | 3/2013 | Honda et al. |
| 2015/0368182 | A1 | 12/2015 | Johnson |
| 2017/0183230 | A1 | 6/2017 | Poshusta et al. |
| 2021/0179428 | A1 | 6/2021 | Luly et al. |

FOREIGN PATENT DOCUMENTS

| | | | |
|---|---|---|---|
| CN | 102341343 | A | 2/2012 |
| CN | 102378737 | A | 3/2012 |
| CN | 102906068 | A | 1/2013 |
| CN | 105102426 | A | 11/2015 |
| CN | 107986248 | A | 5/2018 |
| CN | 108290833 | A | 7/2018 |
| CN | 108975292 | A | 12/2018 |
| CN | 109264682 | A | 1/2019 |
| CN | 109264683 | A | 1/2019 |
| CN | 109592655 | A | 4/2019 |
| CN | 110436424 | A | 11/2019 |
| CN | 112340713 | A | 2/2021 |
| EP | 2415709 | A1 | 2/2012 |
| EP | 2578567 | A1 | 4/2013 |
| JP | 40-024368 | B | 10/1965 |

(Continued)

OTHER PUBLICATIONS

Zhang et al., "Recent progresses on electrolytes of fluorosulfonimide anions for improving the performances of rechargeable Li and Li-ion battery" Journal of Fluorine Chemistry 174, Aug. 2014, 49-61 (Year: 2014).*

(Continued)

*Primary Examiner* — Anthony J Zimmer
*Assistant Examiner* — Abdul-Rahman Yusuf Waleed Smari
(74) *Attorney, Agent, or Firm* — Faegre Drinker Biddle & Reath LLP

(57) ABSTRACT

A process for producing bis(fluorosulfonyl) imide includes providing a solution comprising fluorosulfonic acid and urea, the solution maintained at a solution temperature from about 0° C. to about 70° C.; reacting the solution in the presence of a reaction medium at a reaction temperature from 80° C. to about 170° C. to produce a product stream including bis(fluorosulfonyl) imide, ammonium fluorosulfate and the reaction medium; separating the ammonium fluorosulfate from the product stream to produce an intermediate product stream; and separating the intermediate product stream into a concentrated product stream and a first recycle stream, the concentrated product stream including a higher concentration of bis(fluorosulfonyl) imide than the first recycle stream.

20 Claims, 1 Drawing Sheet

(56) References Cited

FOREIGN PATENT DOCUMENTS

| | | | |
|---|---|---|---|
| JP | 2010-235370 | A | 10/2010 |
| JP | 5444453 | B2 | 3/2014 |
| JP | 2014-105115 | A | 6/2014 |
| JP | 5560136 | B2 | 7/2014 |
| JP | 2019-503956 | A | 2/2019 |
| KR | 10-1687374 | B1 | 12/2016 |
| WO | 2011/111780 | A1 | 9/2011 |
| WO | 2011/148958 | A1 | 12/2011 |

OTHER PUBLICATIONS

Singh et al., "Advances in chemistry of hydrogen bis(fluorosulfonyl)imide and its derivatives" Journal of Fluorine Chemistry 226, Aug. 2019, 1-12 (Year: 2019).*

European Search Report for EP Patent Application No. 20900951.3, Issued on Jul. 17, 2024, 20 pages.

International Search Report and Written Opinion received for PCT Patent Application No. PCT/US20/65102, mailed on Apr. 9, 2021, 5 pages.

* cited by examiner

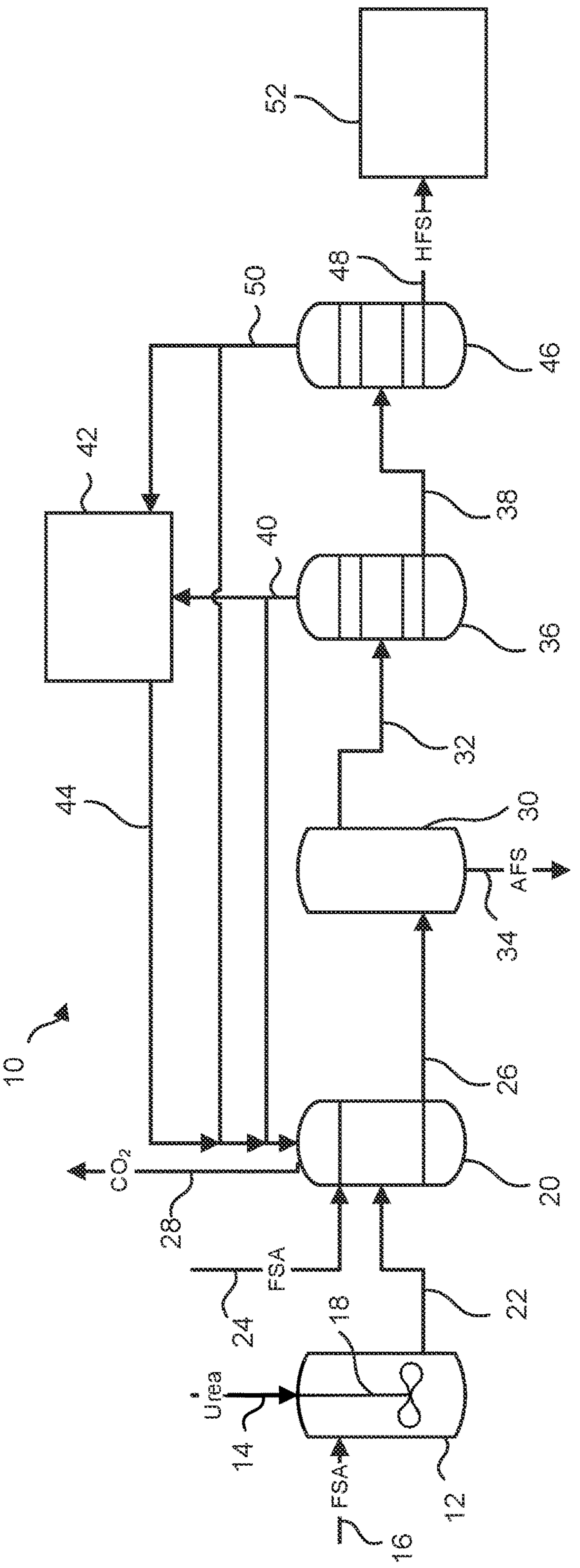
10
12
14
Urea
16
FSA
18
20
22
24
FSA
26
28
$CO_2$
30
AFS
32
34
36
38
40
42
44
46
48
HFSI
50
52

INTEGRATED PROCESSES FOR PRODUCING BIS(FLUOROSULFONYL) IMIDE

CROSS-REFERENCE TO RELATED APPLICATION

This application is a Continuation Application of U.S. patent application Ser. No. 17/117,284, filed Dec. 10, 2020, which claims priority to U.S. Provisional Application No. 62/949,105, filed Dec. 17, 2019, the disclosures of which are herein incorporated by reference in their entireties.

FIELD

The present disclosure relates to processes for producing bis(fluorosulfonyl) imide. Specifically, the present disclosure relates to integrated processes for producing bis(fluorosulfonyl) imide.

BACKGROUND

Bis(fluorosulfonyl) imide (HFSI) is a key raw material in the production of lithium bis(fluorosulfonyl) imide (LiFSI), which is used in lithium ion batteries. HFSI can be prepared by several methods. For example, HFSI can be prepared by the reaction of urea with fluorosulfonic acid shown in Equation 1:

$$5HSO_3F + 2CO(NH_2)_2 \longrightarrow HN(SO_2F)_2 + 2CO_2 + 2NH_4SO_3F. \quad \text{Eq. 1}$$

U.S. Pat. No. 8,337,797 to Honda et al. discloses a two-step batch process for producing HFSI from urea and fluorosulfonic acid. In the first step, the urea is dissolved in the fluorosulfonic acid at a temperature low enough to prevent the reaction of Equation 1 between the urea and the fluorosulfonic acid. In the second step, the urea/fluorosulfonic acid solution is slowly added to separate reaction vessel including a reaction medium heated sufficiently for the reaction of Equation 1 to proceed. The controlled addition permits the heat generated by the exothermic reaction of Equation 1 to be controlled. U.S. Pat. No. 8,337,797 discloses that the heated reaction medium can be fluorosulfonic acid or HFSI, but it is preferable to use a mixture of fluorosulfonic acid and HFSI, with the HFSI serving to further control the reaction, especially at the beginning, when the urea/fluorosulfonic acid solution is first added to the heated reaction medium. However, the batch process as disclosed in U.S. Pat. No. 8,337,797 is not suitable for producing HFSI on an efficient, commercial scale.

International publication WO2011/111780, also to Honda et al., further discloses a recovery process to continuously remove reaction liquid from the reaction vessel, such as through an overflow outlet, continuously discharging the reaction liquid in a slurry state (including the ammonium salt byproduct). The process disclosed is done in production batches, with product HFSI added back to the reaction vessel ahead of the reaction for the next production batch.

Thus, there is a need to develop a more efficient process that may be scaled to produce commercial quantities of HFSI.

SUMMARY

The present disclosure provides integrated processes for producing bis(fluorosulfonyl) imide.

In one form thereof, the present disclosure provides a process of producing bis(fluorosulfonyl) imide. The process includes providing a solution comprising fluorosulfonic acid and urea, the solution maintained at a solution temperature from about 0° C. to about 70° C.; reacting the solution in the presence of a reaction medium at a reaction temperature from 80° C. to about 170° C. to produce a product stream including bis(fluorosulfonyl) imide, ammonium fluorosulfate and the reaction medium; separating the ammonium fluorosulfate from the product stream to produce an intermediate product stream; and separating the intermediate product stream into a concentrated product stream and a first recycle stream, the concentrated product stream including a higher concentration of bis(fluorosulfonyl) imide than the first recycle stream.

In another form thereof, the present disclosure provides an integrated system for the production of bis(fluorosulfonyl) imide. The system includes a vessel, a reactor, a first separator and a second separator. The vessel is configured to connect to a urea input stream and a first fluorosulfonic acid input stream. The vessel is configured to produce a solution comprising fluorosulfonic acid and urea. The vessel is configured to maintain the solution at a solution temperature from about 0° C. to about 70° C. The reactor is fluidly coupled to the vessel to receive the solution comprising fluorosulfonic acid and urea. The reactor includes a second fluorosulfonic acid input stream. The reactor is configured to produce a product stream including bis(fluorosulfonyl) imide, ammonium fluorosulfate and fluorosulfonic acid. The reactor configured to maintain a reactor temperature from 80° C. to about 170° C. The first separator is fluidly coupled to the product stream. The first separator is configured to separate the ammonium fluorosulfate from the product stream to produce an intermediate product stream. The second separator is fluidly coupled to the intermediate product stream. The second separator is configured to produce a concentrated product stream and a first recycle stream. The concentrated product stream includes a concentration of bis(fluorosulfonyl) imide that is greater than a concentration of bis(fluorosulfonyl) imide in the first recycle stream.

The above mentioned and other features of the disclosure, and the manner of attaining them, will become more apparent and will be better understood by reference to the following description of embodiments taken in conjunction with the accompanying drawing.

DESCRIPTION OF THE DRAWINGS

The FIGURE is a process flow diagram showing an integrated process for the continuous manufacturing bis (fluorosulfonyl) imide, according to some embodiments of this disclosure.

DETAILED DESCRIPTION

The present disclosure provides integrated processes which may be scaled to produce commercial quantities of bis(fluorosulfonyl) imide (HFSI). In some embodiments, the processes include recycling the reaction medium in an efficient and continuous manner. Alternatively, or additionally, in some embodiments, the processes include directing the recycled reaction medium to a storage tank. It has been surprisingly found that limiting the amount of HFSI in the reaction medium can dramatically improve process yields.

As disclosed herein, the HFSI is produced from a solution of urea and fluorosulfonic acid. The solution of urea and fluorosulfonic acid is formed by mixing the urea and the fluorosulfonic acid together a solution temperature low enough to substantially prevent the reaction of the urea and the fluorosulfonic acid as shown in Equation 1, but high enough for the efficient dissolution of the urea suitable for a commercial process. The solution temperature may be as low as about 0° C., about 5° C., about 10° C., about 15° C., about 20° C., about 25° C., about 30° C. or about 35° C., or as high as about 40° C., about 45° C., about 50° C., about 55° C., about 60° C., about 65° C. or about 70° C., or within any range defined between any two of the foregoing values, such as about 0° C. to about 70° C., about 5° C. to about 65° C., about 10° C. to about 60° C., about 15° C. to about 55° C., about 20° C. to about 50° C., about 25° C. to about 45° C., about 30° C. to about 40° C., about 35° C. to about 55° C., about 40° C. to about 50° C., or about 25° C. to about 65° C., for example. Preferably, the solution temperature is from about 25° C. to about 60° C. More preferably, the solution temperature is from about 30° C. to about 55° C. Most preferably, the solution temperature is from about 30° C. to about 50° C.

A mole ratio of fluorosulfonic acid to urea in the solution of urea and fluorosulfonic acid should be high enough for fluorosulfonic acid to dissolve all of the urea to create a homogenous, liquid-phase solution, rather than a slurry including undissolved urea which can make transporting the solution more difficult. However, adding too much fluorosulfonic acid reduces the efficiency of the process by requiring larger systems and increased energy to handle transport the solution and later separate the excess fluorosulfonic acid from the HFSI. Thus, the mole ratio of fluorosulfonic acid to urea in the solution may be as low as about 2.0:1, about 2.1:1, about 2.2:1, about 2.3:1, about 2.4:1 or about 2.5:1, or as high as about 2.6:1, about 2.7:1, about 2.8:1, about 2.9:1, or about 3.0:1, or within any range defined between any two of the foregoing values, such as about 2.0:1 to about 3.0:1, about 2.1:1 to about 2.9:1, about 2.2:1 to about 2.8:1, about 2.3:1 to about 2.7:1, about 2.4:1 to about 2.6:1, about 2.5:1 to about 2.6:1, about 2.4:1 to about 2.7:1, about 2.4:1 to about 2.5:1 or about 2.6:1 to about 2.8:1, for example. Preferably, the mole ratio of fluorosulfonic acid to urea in the solution is from about 2.2:1 to about 2.8:1. More preferably, the mole ratio of fluorosulfonic acid to urea in the solution is from about 2.3:1 to about 2.7:1. Most preferably, the mole ratio of fluorosulfonic acid to urea in the solution is from about 2.4:1 to about 2.6:1.

The solution of urea and fluorosulfonic acid is added to a reaction medium at a reaction temperature to react the fluorosulfonic acid and the urea to produce a product stream including HFSI, as well as ammonium fluoride, as shown in Equation 1. The carbon dioxide gas produced may be vented or captured for other uses. The reaction medium includes fluorosulfonic acid. The reaction medium may further include HFSI.

The reaction medium heats the solution of urea and fluorosulfonic acid and helps to control the reaction. In some embodiments, a weight ratio of reaction medium to the solution of urea and fluorosulfonic acid may be as low as about 0.1:1, about 0.2:1, about 0.3:1, about 0.4:1, about 0.5:1, about 0.6:1 or about 0.8:1, or as high as about 1:1, about 2:1, about 4:1, about 6:1, about 8:1, or about 10:1, or within any range defined between any two of the foregoing values, such as about 0.1:1 to about 10:1, about 0.2:1 to about 8:1, about 0.3:1 to about 6:1, about 0.4:1 to about 4:1, about 0.6:1, to about 2:1, about 0.8:1 to about 1:1, about 0.4:1 to about 1:1, or about 0.6:1 to about 0.8:1, for example.

In some embodiments, the weight ratio of the reaction medium to the solution of urea and fluorosulfonic acid is high enough to completely dissolve the reaction byproducts, including the ammonium fluorosulfate, so as to prevent the need to handle a slurry. Thus, in some embodiments in which the ammonium fluorosulfate is completely dissolved, preferably, the weight ratio of the reaction medium to the solution of urea and fluorosulfonic acid is from about 0.3:1 to about 2:1. More preferably, the weight ratio of the reaction medium to the solution of urea and fluorosulfonic acid is from about 0.4:1 to about 1:1. Most preferably, the weight ratio of the reaction medium to the solution of urea and fluorosulfonic acid is from about 0.6:1 to about 0.8:1.

However, increasing the amount of reaction medium reduces the efficiency of the process to the extent that it requires larger systems and increased energy usage to separate the HFSI product from the reaction medium. Thus, in some embodiments, it is desirable to use a lower weight ratio of the reaction medium to the solution of urea and fluorosulfonic acid, resulting in the formation of a slurry including undissolved ammonium fluorosulfate. In such embodiments, in which the ammonium fluorosulfate is not completely dissolved, preferably, the weight ratio of the reaction medium to the solution of urea and fluorosulfonic acid is from about 0.1:1 to about 0.6:1. More preferably, the weight ratio of the reaction medium to the solution of urea and fluorosulfonic acid is from about 0.1:1 to about 0.4:1. Most preferably, the weight ratio of the reaction medium to the solution of urea and fluorosulfonic acid is from about 0.1:1 to about 0.3:1.

The reaction temperature may be as low as about 80° C., about 90° C., about 100° C., about 110° C., or about 120° C., or as high as about 130° C., about 140° C., about 150° C., about 160° C. or about 170° C., or within any range defined between any two of the foregoing values, such as about 80° C. to about 170° C., about 90° C. to about 160° C., about 100° C. to about 150° C., about 110° C. to about 140° C., about 120° C. to about 130° C., about 130° C. to about 150° C., or about 110° C. to about 120° C., for example. Preferably, the reaction temperature is from about 110° C. to about 140° C. More preferably, the reaction temperature is from about 120° C. to about 140° C. Most preferably, the reaction temperature is from about 120° C. to about 130° C.

The ammonium fluorosulfate is separated from the product stream. The ammonium fluorosulfate may be separated by evaporation, spray drying, filtration, or any combination thereof, for example.

The product stream is separated into a concentrated product stream and a first recycle stream. The concentrated product stream includes a higher concentration of the HFSI than the first recycle stream. In some embodiments, the first recycle stream is recycled back to the reaction medium. In some embodiments, the first recycle stream may alternatively, or additionally, be directed to a storage tank for later use. The separation may be by distillation, for example.

It has been found that adding HFSI to the reaction medium reduces the yield of the HFSI in the system. Thus, a concentration of HFSI in the first recycle stream is less than about 50 weight percent (wt. %), 40 wt. %, 30 wt. %, 20 wt. %, 10 wt. %, 5 wt. %, 3 wt. %, 2 wt. %, 1 wt. %, or 0.5 wt. %, or less than any value between any two of the foregoing values. Preferably, the concentration of HFSI in the first recycle stream is less than 20 wt. %. More preferably, the concentration of HFSI in the first recycle stream is less than 10 wt. %. Most preferably, the concentration of HFSI in the first recycle stream is less than 5 wt. %.

Optionally, the concentrated product stream may be separated into a further concentrated product stream and a second recycle stream. The further concentrated product stream includes a higher concentration of the HFSI than the second recycle stream. In some embodiments, the second recycle stream is recycled back to the reaction medium. Alternatively, or additionally, in some embodiments, the second recycle stream is directed to a storage tank for later use. The separation may be by distillation, for example.

In some embodiments, the processes described above are continuous processes. In some other embodiments, the processes described above are semi-batch. By semi-batch, it is meant that while significant portions of the process are continuous, the entire process is not continuous. For example, in some semi-batch embodiments, the product stream may be produced and stored in continuous fashion for some period of time, and then at a later time, the stored product stream may be processed through the separation steps to separate the ammonium fluorosulfate from the product stream, and to produce the concentrated product stream and a first recycle stream in a continuous fashion, with the concentrated product stream stored and the first recycle stream stored for later use as a reaction medium for the production of another product stream. In some other semi-batch embodiments, the intermediate product stream may be produced and stored in continuous fashion for some period of time, and then at a later time, the stored intermediate product stream may be processed through the separation step to produce the concentrated product stream and a first recycle stream in a continuous fashion, with the concentrated product stream stored and the first recycle stream stored for later use as a reaction medium for the production of another product stream.

The FIGURE is a process flow diagram showing an integrated system 10 for manufacturing HFSI, according to some embodiments. As shown in the FIGURE, the system 10 includes a vessel 12 configured to connect to a urea input stream 14 and a first fluorosulfonic acid input stream 16. Fluorosulfonic acid in the first fluorosulfonic acid input stream 16 is in liquid form and may be continuously pumped into the vessel 12. Alternatively, the fluorosulfonic acid in the first fluorosulfonic acid input stream 16 may be added as a batch. Urea in the urea input stream 14 is in solid form and may be continuously provided to the vessel 12 by a solid conveying system (not shown), for example. Alternatively, the urea in the input stream 14 may be added to the vessel 12 as a batch.

The vessel 12 is equipped with a mixing device 18, such as an agitator, for example, and an optional cooling mechanism (not shown), such as a heat transfer coil, for example. In the vessel 12, the urea from the urea input stream 14 and the fluorosulfonic acid from the first fluorosulfonic acid input stream 16 are mixed by the mixing device 18 to form a solution including fluorosulfonic acid and urea. The urea/fluorosulfonic acid solution is maintained at a solution temperature, as described above, and may be cooled, if necessary, by the cooling mechanism to substantially prevent the reaction of Equation 1. In this way, the vessel 12 is configured to produce the urea/fluorosulfonic acid solution.

A reactor 20 is fluidly coupled to the vessel 12 by a reactant stream 22 to receive the urea/fluorosulfonic acid solution from the vessel 12. The reactor 20 contains a reaction medium input stream 24 to provide a reaction medium to the reactor 20. The reaction medium may include fluorosulfonic acid, in which case the reaction medium input stream 24 is a second fluorosulfonic acid input stream. The reaction medium within the reactor 20 is heated to a reaction temperature, as described above, to produce a product stream 26 including HFSI according to the reaction of Equation 1. The carbon dioxide may be vented from the reactor 20 through a reactor vent 28. The reactor 20 is configured to maintain the reaction temperature by way of a fluid flowing through a heat exchanger or jacketed reactor (not shown), or by an electric heating coil (not shown), for example. In this way, the reactor 20 is configured to produce the product stream 26 including HFSI, ammonium fluorosulfate, and fluorosulfonic acid.

The product stream 26 fluidly connects the reactor 20 to a first separator 30. The first separator 30 is configured to separate the ammonium fluorosulfate from the product stream 26 to produce in intermediate product stream 32. The ammonium fluorosulfate is removed by a purge 34. The first separator 30 can be an evaporator, a spray drier, a filter, a centrifuge, or any combination thereof, for example.

The intermediate product stream 32 fluidly connects the first separator 30 to a second separator 36. The second separator 36 is configured to produce a concentrated product stream 38 and a first recycle stream 40. The second separator 36 can be a distillation column, for example. The concentrated product stream 38 includes a concentration of HFSI that is greater than a concentration of HFSI in the first recycle stream 40. The first recycle stream 40 is fluidly coupled to the reactor 20. Alternatively, or additionally as shown in the FIGURE, the first recycle stream 40 is fluidly coupled to a reaction medium recycle storage tank 42. The first recycle stream 40 can be directed to the reactor 20 for continuous operation, or to the reaction medium recycle storage tank 42 for semi-batch operation. A reaction medium recycle stream 44 is fluidly couples the reaction medium recycle storage tank 42 to the reactor 20 to provide the stored recycled reaction medium to the reactor 20 at a later time.

Optionally, the concentrated product stream 38 fluidly connects the second separator 36 to a third separator 46. The third separator 46 is configured to produce a further concentrated product stream 48 and a second recycle stream 50. The third separator 46 can be another distillation column, for example. The further concentrated product stream 48 includes a concentration of HFSI that is greater than a concentration of HFSI in the second recycle stream 50. The second recycle stream 50 is fluidly coupled to the reactor 20. Alternatively, or additionally as shown in the FIGURE, the second recycle stream 50 is fluidly coupled to the reaction medium recycle storage tank 42. The second recycle stream 50 can be directed to the reactor 20 for continuous operation, or to the reaction medium recycle storage tank 42 for semi-batch operation.

The further concentrated product stream 48 may be fluidly connect to an HSFI storage tank 52 for further use or purification. Alternatively, in embodiments in which the third separator 46 is not employed, the concentrated product stream 38 may be fluidly coupled to the HSFI storage tank 52 directly.

As described above, the system 10 of the FIGURE may be operated a continuous mode or in a semi-batch mode.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value. As used herein, the singular forms "a", "an" and "the" include plural unless the context clearly dictates otherwise.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

EXAMPLES

Example 1—Effect of Bis(fluorosulfonyl) Imide in the Reaction Medium on the Yield of Bis(fluorosulfonyl) Imide—with Precipitation of Ammonium Fluorosulfate In this Example, the effect of bis(fluorosulfonyl) imide (HFSI) in the reaction medium on the yield of bis(fluorosulfonyl) imide under conditions where the ammonium fluorosulfate (AFS) forms a precipitate. For each sample 1-8, urea was slowly added to fluorosulfonic acid (FSA) in a vessel with stirring to form a solution of urea and FSA, as shown in Table 1 below. During the addition of the urea, the vessel was under a nitrogen flow while the temperature was maintained under 40° C. After the urea was added, the solution was allowed to equilibrate to room temperature.

A 5-liter, three-neck flask was prepared as a reactor. The reactor was fitted with an overhead stirrer in the center neck. Another neck contained a condenser with a nitrogen flow inlet at the top. The third neck was fitted with a thermocouple, a feed tube from a peristaltic pump, and an outlet to a scrubber. Fluorocarbon wax was used to seal connecting ground glass joints. Reaction medium was added to the reactor, as shown in Table 1, and the reactor heated with an electric heating mantle to a controlled temperature of about 130° C. When the reaction medium in the reactor equilibrated to 130° C., the solution of urea and FSA was pumped from the vessel into the reactor using the peristaltic pump over a period of about 3.5 hours to cause the urea and FSA to react and form HFSI. During the reaction, the carbon dioxide gas that formed was vented from the reactor.

Early in the reaction, the reactor contents appeared as a clear liquid. As the reaction progressed, the solubility limit of the AFS was reached and it began to precipitate from the solution. As the reaction progressed further and the AFS precipitate continued to accumulate, the reactor contents became a slurry. After the addition of the solution of urea and FSA from the vessel was complete, the reactor was maintained at 130° C. for an additional 4 hours, after which the heat was turned off and the reactor allowed to cool to room temperature.

The reactor was reconfigured and the liquid in the reactor was evaporated under vacuum from the AFS precipitate with the evaporated product collected in a vessel cooled by a bath of dry ice and acetone. The liquid was initially evaporated at about 110-120° C. for a few hours, and then at about 150-160° C. for about 20 hours. The product collected was weighed and the reaction yield calculated based on amount of urea added to the reactor. The results are shown in Table 1 below. As shown in Table 1, increasing the concentration of HFSI in the reaction medium significantly reduces the yield of HFSI.

TABLE 1

| | Solution | | | Reaction Medium | | | |
|---|---|---|---|---|---|---|---|
| Sample | Urea (g) | FSA (g) | Mole Ratio FSA:Urea | FSA (g) | HFSI (g) | Weight % HFSI | HFSI Yield % |
| 1 | 795 | 3,307 | 2.50:1 | 803 | 0 | 0% | >99% |
| 2 | 723 | 3,012 | 2.50:1 | 802 | 0 | 0% | 98% |
| 3 | 760 | 3,134 | 2.47:1 | 803 | 0 | 0% | >99% |
| 4 | 761 | 3,172 | 2.50:1 | 0 | 811 | 100% | 53% |
| 5 | 780 | 3,246 | 2.50:1 | 150 | 645 | 81% | 76% |
| 6 | 795 | 3,313 | 2.50:1 | 399 | 416 | 51% | 92% |
| 7 | 850 | 3,538 | 2.50:1 | 599 | 206 | 26% | 86% |
| 8 | 371 | 1,545 | 2.50:1 | 0 | 800 | 100% | 57% |

Example 2—Effect of Bis(fluorosulfonyl) Imide in the Reaction Medium on the Yield of Bis(fluorosulfonyl) Imide—without Precipitation of Ammonium Fluorosulfate In this Example, the effect of bis(fluorosulfonyl) imide (HFSI) in the reaction medium on the yield of bis(fluorosulfonyl) imide under conditions where the ammonium fluorosulfate (AFS) does not form a precipitate, is demonstrated. Each sample 9-12 was prepared as described above in Example 1, and shown in Table 2 below, except that the addition of the solution of urea and FSA was stopped just as reactor contents began to turn cloudy. The results are shown in Table 2. As shown in Table 2, the amount of AFS precipitate has little effect on yield. Consistent with the results of Example 1, increasing the concentration of HFSI in the reaction medium significantly reduces the yield of HFSI.

TABLE 2

| | Solution | | | Reaction Medium | | | |
|---|---|---|---|---|---|---|---|
| Sample | Urea (g) | FSA (g) | Mole Ratio FSA:Urea | FSA (g) | HFSI (g) | Weight % HFSI | HFSI Yield % |
| 9 | 211 | 879 | 2.50:1 | 799 | 0 | 0% | 95% |
| 10 | 172 | 709 | 2.47:1 | 591 | 207 | 26% | 78% |
| 11 | 373 | 1,554 | 2.50:1 | 275 | 523 | 66% | 70% |
| 12 | 240 | 998 | 2.50:1 | 0 | 797 | 100% | 21% |

ASPECTS

Aspect 1 is a process for producing bis(fluorosulfonyl) imide. The process includes providing a solution comprising fluorosulfonic acid and urea, the solution maintained at a solution temperature from about 0° C. to about 70° C.; reacting the solution in the presence of a reaction medium at a reaction temperature from 80° C. to about 170° C. to produce a product stream including bis(fluorosulfonyl) imide, ammonium fluorosulfate and the reaction medium; separating the ammonium fluorosulfate from the product stream to produce an intermediate product stream; and separating the intermediate product stream into a concentrated product stream and a first recycle stream, the concentrated product stream including a higher concentration of bis(fluorosulfonyl) imide than the first recycle stream.

Aspect 2 is the process of Aspect 1, further including recycling the first recycle stream back to the reacting step.

Aspect 3 is the process of Aspect 2, wherein the process is a continuous process.

Aspect 4 is the process of Aspect 1, further including recycling the first recycle stream to a storage tank.

Aspect 5 is the process of Aspect 4, wherein the process is a semi-batch process.

Aspect 6 is the process of any of Aspects 1-5, wherein the reaction medium includes fluorosulfonic acid.

Aspect 7 is the process of any of Aspects 1-6 wherein a concentration of bis(fluorosulfonyl) imide in the first recycle stream is less than 50 wt. % of the first recycle stream.

Aspect 8 is the process of Aspect 7, wherein the concentration of bis(fluorosulfonyl) imide in the first recycle stream is less than 10 wt. % of the first recycle stream.

Aspect 9 is the process of any of Aspects 1-8, wherein in the providing step, the solution comprising fluorosulfonic acid and urea is formed by mixing urea and fluorosulfonic acid together at the solution temperature.

Aspect 10 is the process of any of Aspects 1-9, wherein in the providing step, the solution comprising fluorosulfonic acid and urea is formed by mixing the fluorosulfonic acid and the urea together at a mole ratio of from about 2.0:1 to about 3.0:1.

Aspect 11 is the process of any of Aspects 1-10, wherein separating the intermediate product stream into the concentrated product stream and the first recycle stream includes distilling the product stream.

Aspect 12 is the process any of Aspects 1-11, wherein separating the ammonium fluorosulfate from the product stream includes evaporating the product stream to form the intermediate product stream.

Aspect 13 is the process of any of Aspects 1-12, further including separating the concentrated product stream into a further concentrated product stream and a second recycle stream. The further concentrated product stream includes a higher concentration of bis(fluorosulfonyl) imide than the second recycle stream.

Aspect 14 is the process of Aspect 13, wherein and the second recycle stream is recycled back to the reacting step.

Aspect 15 is an integrated system for the production of bis(fluorosulfonyl) imide. The system includes a vessel, a reactor, a first separator and a second separator. The vessel is configured to connect to a urea input stream and a first fluorosulfonic acid input stream. The vessel is configured to produce a solution comprising fluorosulfonic acid and urea. The vessel is configured to maintain the solution at a solution temperature from about 0° C. to about 70° C. The reactor is fluidly coupled to the vessel to receive the solution comprising fluorosulfonic acid and urea. The reactor includes a second fluorosulfonic acid input stream. The reactor is configured to produce a product stream including bis(fluorosulfonyl) imide, ammonium fluorosulfate and fluorosulfonic acid. The reactor configured to maintain a reactor temperature from 80° C. to about 170° C. The first separator is fluidly coupled to the product stream. The first separator is configured to separate the ammonium fluorosulfate from the product stream to produce an intermediate product stream. The second separator is fluidly coupled to the intermediate product stream. The second separator is configured to produce a concentrated product stream and a first recycle stream. The concentrated product stream includes a concentration of bis(fluorosulfonyl) imide that is greater than a concentration of bis(fluorosulfonyl) imide in the first recycle stream.

Aspect 16 is the system of Aspect 15, wherein the first recycle stream is recycled back to the reactor.

Aspect 17 is the system of Aspect 15, wherein the first recycle stream is directed to a storage tank.

Aspect 18 is the system of any of Aspects 15-17, wherein the vessel includes a mixing device.

Aspect 19 is the system of any of Aspects 15-18, wherein the first separator is an evaporator.

Aspect 20 is the system of any of Aspects 15-19, wherein the second separator is a distillation column.

Aspect 21 is the system of any of Aspects 15-20, further including a third separator fluidly coupled to the concentrated product stream. The third separator is configured to produce a further concentrated product stream and a second recycle stream. The further concentrated product stream includes a concentration of bis(fluorosulfonyl) imide that is greater than a concentration of bis(fluorosulfonyl) imide in the second recycle stream.

Aspect 22 is the system of Aspect 21, wherein the third separator is a distillation column.

Aspect 23 is the system of any of Aspects 15-22, wherein a concentration of bis(fluorosulfonyl) imide in the first recycle stream is less than 50 wt. % of the first recycle stream.

Aspect 24 is the system of Aspect 23, wherein the concentration of bis(fluorosulfonyl) imide in the first recycle stream is less than 10 wt. % of the first recycle stream.

Aspect 25 is the system of any of Aspects 15-24, wherein the solution comprising the fluorosulfonic acid and the urea comprises the fluorosulfonic acid and the urea in a mole ratio of from about 2.0:1 to about 3.0:1.

Aspect 26 is the system of any of Aspects 15-25, wherein the system is configured for continuous operation.

Aspect 27 is the system of any of Aspects 15-25, wherein the system is configured for semi-batch operation.

The invention claimed is:

1. A process for producing bis(fluorosulfonyl) imide, the process comprising:

providing a solution comprising fluorosulfonic acid and urea, the solution maintained at a solution temperature from about 20° C. to about 50° C. and at a mole ratio of fluorosulfonic acid to urea of at least 2.5;

reacting the solution in the presence of a reaction medium at a reaction temperature from about 100° C. to about 150° C. to produce a product stream including bis(fluorosulfonyl) imide, ammonium fluorosulfate and the reaction medium;

separating the ammonium fluorosulfate from the product stream to produce an intermediate product stream; and separating the intermediate product stream into a concentrated product stream comprising bis(fluorosulfonyl) imide and a first recycle stream, the concentrated product stream including a higher concentration of bis(fluorosulfonyl) imide than the first recycle stream.

2. The process of claim 1, further comprising recycling the first recycle stream back to the reacting step.

3. The process of claim 2, wherein the process is a continuous process.

4. The process of claim 1, further comprising recycling the first recycle stream to a storage tank.

5. The process of claim 4, wherein the process is a semi-batch process.

6. The process of claim 1, wherein the reaction medium includes fluorosulfonic acid.

7. The process of claim 1, wherein a concentration of bis(fluorosulfonyl) imide in the first recycle stream is less than 50 wt. % of the first recycle stream.

8. The process of claim 1, wherein in the providing step, the solution comprising fluorosulfonic acid and urea is formed by mixing the urea and the fluorosulfonic acid together at the solution temperature.

9. The process of claim 8, wherein in the providing step, the solution comprising fluorosulfonic acid and urea is formed by mixing the fluorosulfonic acid and the urea together at a mole ratio of from about 2.5:1 to about 3.0:1.

10. The process of claim 1, wherein separating the intermediate product stream into the concentrated product stream and the first recycle stream includes distilling the product stream.

11. The process of claim 1, wherein separating the ammonium fluorosulfate from the product stream includes evaporating the product stream to form the intermediate product stream.

12. The process of claim 1, further comprising:

separating the concentrated product stream comprising bis(fluorosulfonyl) imide into a further concentrated product stream comprising bis(fluorosulfonyl) imide and a second recycle stream, the further concentrated product stream including a higher concentration of bis(fluorosulfonyl) imide than the second recycle stream.

13. The process of claim 1, wherein in the providing step, the solution is maintained at a solution temperature from about 30° C. to about 50° C.

14. The process of claim 1, wherein in the providing step, the mole ratio of fluorosulfonic acid to urea is at least 2.7.

15. The process of claim 1, wherein in the providing step, the mole ratio of fluorosulfonic acid to urea is at least 2.8.

16. The process of claim 1, wherein the reacting step is conducted at a reaction temperature from about 110° C. to about 140° C.

17. The process of claim 1, wherein the reacting step is conducted at a reaction temperature from about 120° C. to about 130° C.

18. The process of claim 7, wherein a concentration of bis(fluorosulfonyl) imide in the first recycle stream is less than 30 wt. % of the first recycle stream.

19. The process of claim 7, wherein a concentration of bis(fluorosulfonyl) imide in the first recycle stream is less than 10 wt. % of the first recycle stream.

20. The process of claim 7, wherein a concentration of bis(fluorosulfonyl) imide in the first recycle stream is less than 5 wt. % of the first recycle stream.

* * * * *